(12) United States Patent
Krishnamurthy (10) Patent No.: US 10,886,903 B1
(45) Date of Patent: Jan. 5, 2021

(54) PROGRAMMABLE CLOCK SKEWING FOR TIMING CLOSURE

(71) Applicant: Apple Inc., Cupertino, CA (US)

(72) Inventor: Harsha Krishnamurthy, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/545,120

(22) Filed: Aug. 20, 2019

(51) Int. Cl.
| | | |
|---|---|---|
| *H03K 5/13* | (2014.01) | |
| *G06F 1/08* | (2006.01) | |
| *G06F 30/398* | (2020.01) | |
| *H03K 5/00* | (2006.01) | |
| *G06F 119/12* | (2020.01) | |

(52) U.S. Cl.
CPC ............... *H03K 5/13* (2013.01); *G06F 1/08* (2013.01); *G06F 30/398* (2020.01); *G06F 2119/12* (2020.01); *H03K 2005/00019* (2013.01)

(58) Field of Classification Search
CPC ........... H03K 5/13; H03K 5/133; H03K 5/135
See application file for complete search history.

(56) References Cited

U.S. PATENT DOCUMENTS

| | | | | |
|---|---|---|---|---|
| 8,531,225 B1* | 9/2013 | Hussain | .................. | H03K 5/133 327/276 |
| 8,856,578 B2* | 10/2014 | Itou | ....................... | H03L 7/0816 713/503 |
| 9,053,257 B2* | 6/2015 | Schreiber | ............... | H03K 19/00 |
| 9,407,247 B2 | 8/2016 | Drake et al. | | |
| 9,536,038 B1* | 1/2017 | Quinton | ............... | G06F 30/3312 |
| 9,664,737 B2 | 5/2017 | Tee et al. | | |
| 9,760,672 B1* | 9/2017 | Taneja | ..................... | G06F 30/39 |
| 10,069,496 B1 | 9/2018 | Behl | | |
| 2009/0134912 A1* | 5/2009 | Habel | ..................... | H03K 3/011 326/93 |
| 2012/0044003 A1* | 2/2012 | Itou | ......................... | H04L 25/14 327/160 |

(Continued)

OTHER PUBLICATIONS

AutoRex: An Automated Post-Silicon Clock Tuning Tool; D. Tadesse, J. Grodstein, R. I. Bahar; 2009, 10 pages. Paper 5.1 978-1-4244-4867—Aug. 9, 2009 IEEE International Test Conference.

(Continued)

*Primary Examiner* — Adam D Houston
(74) *Attorney, Agent, or Firm* — Kowert, Hood, Munyon, Rankin & Goetzel, P.C.; Lawrence J. Merkel (57) ABSTRACT

In one embodiment, an integrated circuit may be designed using a library of clocked circuits that have programmable clock delays that may be inserted on the clock input to the clocked circuits. During the design process, timing paths which are challenging due to significant variations across operating states, process corners, and/or temperature may be met by using the clocked circuits with programmable delays and inserting a delay control circuit that programs the delays based on the current operating state, process corner used to manufacture the integrated circuit, and/or temperature. That is, different delays may be selected by the delay control circuit depending on inputs that identify the operating state, the process corner, and/or the temperature. Because the clock delay is intentionally skewed, the timing of the path may be different at different operating states, temperatures, or process corners and thus may meet timing by changing the clock skew during operation.

20 Claims, 8 Drawing Sheets

(56) References Cited

U.S. PATENT DOCUMENTS

| | | | | |
|---|---|---|---|---|
| 2013/0117582 | A1* | 5/2013 | Satyamoorthy | G06F 1/3296 |
| | | | | 713/300 |
| 2013/0311792 | A1* | 11/2013 | Ponnathota | G06F 1/26 |
| | | | | 713/300 |
| 2013/0311799 | A1* | 11/2013 | Fitzpatrick | G06F 1/3287 |
| | | | | 713/320 |
| 2016/0065195 | A1* | 3/2016 | Farazian | H03K 5/1506 |
| | | | | 327/238 |
| 2016/0380748 | A1* | 12/2016 | Simpson | H04L 7/0012 |
| | | | | 375/359 |
| 2017/0046469 | A1* | 2/2017 | Rao | G06F 30/398 |
| 2020/0005729 | A1* | 1/2020 | Mozak | H03K 5/135 |
| 2020/0028514 | A1* | 1/2020 | Hanke | H03K 5/134 |
| 2020/0081062 | A1* | 3/2020 | Goh | H03K 5/133 |
| 2020/0091608 | A1* | 3/2020 | Alpman | H01Q 1/38 |
| 2020/0118612 | A1* | 4/2020 | Finn | G11C 7/222 |
| 2020/0143901 | A1* | 5/2020 | Chhabra | G11C 29/12015 |

OTHER PUBLICATIONS

EE201C; UCLA WIN12; Professor Lie He; Final Project; Mar. 28; Fariborz Dadnam; 9 Pages; Post-Silicon Tuning with the Aim of Clock Skew Reduction (publication date unknown, printed from the Internet on Aug. 5, 2019).

Unified Adaptivity Optimization of Clock and Logic Signals Shiyan Hu, Jiang Hu; 6 pages; 2007 IEEE.

Nagaraj, Kelageri, "Post Silicon Clock Tuning System To Mitigate The Impact Of Process Variation On Performance" (2010). MastersTheses 1911—Feb. 2014. 378.Retrieved from https://scholarworks.umass.edu/theses/378, 76 pages.

* cited by examiner

PROGRAMMABLE CLOCK SKEWING FOR TIMING CLOSURE

BACKGROUND

Technical Field

Embodiments described herein are related to integrated circuits that include clocked circuit elements having programmable clock skew and a method for using the programmable clock skew to facilitate timing closure across different operating states.

Description of the Related Art

Digital integrated circuits generally implement combinatorial logic circuits that receive inputs launched according to a clock and must complete their operations so that outputs can be captured according to the same clock. That is, the propagation delays through the logic circuitry must generally be less than the clock cycle time. Static timing analysis is used to determine if the propagation delays along various paths (input to output) in the integrated circuit meet the timing requirements for the clock cycle time. Paths that are not meeting timing (e.g. the propagation delay is greater than the required clock cycle time) are identified so that designers can revise the design in attempts to make the paths faster.

In some cases, an integrated circuit has a wide range of potential operating states and other factors that affect the timing of the paths over which the integrated circuit is required to operate. For example, microprocessors and/or systems on a chip (SOCs) can have numerous operating states (combinations of supply voltage and clock frequency) at which they are required to operate. Changes in the supply voltage can cause changes in the delays on the paths, and some paths scale differently based the amount of delay that is the operation of the logic circuits versus the amount of delay that is due to parasitic capacitance and resistance in the path. Thus, a path that meets timing at one operating state may not meet timing at another operating state. In addition to the operating states, the design is generally required to meet timing across variations in the manufacturing process. Differences in the manufacturing process can lead to faster or slower circuits. Generally, the design is timed using various points across the spectrum of manufacturing process differences. Each point at which timing is measured as a function of manufacturing process variation is referred to as a process corner. Additionally, the temperature at which the integrated circuit operates can vary, and timing of the paths can vary as a function of temperature as well.

The process of performing static timing analysis, modifying the design, and repeating the analysis can consume a large part of the integrated circuit design cycle. Achieving timing closure, which refers to the integrated circuit design meeting timing requirements at each combination of operating state, temperature, and process corner, is a significant challenge. In some cases, timing closure is not reached and timing targets have to be relaxed to meet schedule requirements. In addition to meeting both setup and hold time requirements for timing closure, many integrated circuit designs are being optimized for power. Paths that have timing slack, meaning that they meet timing requirements with a margin of additional time, can be revised to consume less power at a cost of a longer path delay, reducing the margin. Power optimization can make the paths more challenging to close across the operating states, process corners, and temperatures.

SUMMARY

In one embodiment, an integrated circuit may be designed using a library of clocked circuits that have programmable clock delays that may be inserted on the clock input to the clocked circuits. The clocked circuits may include sequential elements (e.g. flops, latches, registers, etc.), macros such as register files and memory arrays, and/or clock gater circuits that provide a conditionally gated clock to sets of other clocked circuits. During the design process, timing paths which are challenging due to significant variations across operating states, process corners, and/or temperature may be met by using the clocked circuits with programmable delays and inserting a delay control circuit that programs the delays based on the current operating state, process corner used to manufacture the integrated circuit, and/or temperature. That is, different delays may be selected by the delay control circuit depending on inputs that identify the operating state, the process corner, and/or the temperature. Because the clock delay is intentionally varied (or skewed), the timing of the path may be different at different operating states, temperatures, or process corners and thus may meet timing in each case by changing the clock skew during operation. The programmable clock skew and delay controls may also be used, in some embodiments, to improve yield and enhance post silicon validation debugging, as described in more detail below.

BRIEF DESCRIPTION OF THE DRAWINGS

The following detailed description makes reference to the accompanying drawings, which are now briefly described.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean "including, but not limited to." As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be said to be "configured" to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

This specification may use the words "a" or "an" to refer to an element, or "the" to refer to the element. These words are not intended to mean that there is only one instance of the element. There may be more than one in various embodiments. Thus, "a", "an", and "the" should be interpreted to mean "one or more" unless expressly described as only one.

This specification may describe various components, units, circuits, etc. as being coupled. In some embodiments, the components, units, circuits, etc. may be coupled if they are electrically coupled (e.g. directly connected or indirectly connected through one or more other circuits) and/or communicatively coupled.

DETAILED DESCRIPTION OF EMBODIMENTS

In an embodiment, a library of clocked circuits is provided for the design of an integrated circuit, with programmable clock delays incorporated into the clocked circuits in the library. Different variations of the same underlying clocked circuit (e.g. a flop) may be provided with different amounts of selectable clock delay (or clock skew). The programmable clocked circuits may have a delay input that may be driven by a delay control circuit in the integrated circuit. The delay control circuit may be designed to select the appropriate delay for combinations of current operating states, process corners, and/or current temperatures. The timing of the path may thus be varied as needed to meet timing requirements, providing more flexibility in the design process for the integrated circuit. Timing closure may be more rapidly achieved by providing the designers with the library of programmable clocked circuits to use in tuning the timing paths in their designs. That is, when faced with a difficult timing path that scales differently across the operating states, process corners, and/or temperatures, a designer may instantiate a programmable clocked circuit that supports a set of delays which allow the path to meet timing across the operating states, process corners, and temperatures. The delay control circuit may be coded to select the delays for the instantiated programmable clocked circuit based on inputs that identify the operating state, process corner, and temperature. The process of analyzing the paths and instantiating the programmable clocked circuits may be manual (performed by the designer directly), may be automatically implemented in the design tools available to the designer, or a combination of manual and automatic insertion may be used.

In an embodiment, the programmable clocked circuits may be inserted as needed in a design, and standard clocked circuits without programmable clock delays may be used on paths that are not challenging. The programmable clocked circuits may be larger and/or may consume more power than their non-programmable counterparts, and thus it may not be desirable to use the programmable clocked circuits for all clocked circuits in the design.

Generally, a clocked circuit may include any standard cell in a standard cell library that receives a clock input and performs an operation that is at least in part responsive to the clock input. The clocked circuits may include sequential elements which capture and store data from a data input to the sequential element responsive to the clock input. For example, sequential elements may include flops, latches, registers, and the like. The sequential elements may also launch the stored data on a data output of the sequential elements responsive to the clock input. The clocked circuits may include clock gater circuits. A clock gater circuit may be included in the clock tree that distributes the clock across the integrated circuit, and may be used to conditionally gate the clock when the circuitry served by the clock gater circuit is idle. That is, a gated clock is not toggling while it is gated, and is toggling when ungated. The clocked circuits may also include custom macros such as register files, memories such as static random access memories, and the like. The custom macros may use the clock input in a variety of ways that are custom-designed for the macro. The clocked circuits may further include programmable delay circuits that apply a programmable delay to a clock input to generate a clock output.

In addition to facilitating timing closure, the programmable clocked circuits may be used to enhance other aspects of the integrated circuit. For example, programmable clocked circuits may be instantiated on paths that appear to meet timing requirements, but which are vulnerable to failure because the timing slack is relatively small. Also, paths which have characteristics that have shown difficulty in the past may be considered vulnerable and may have programmable clocked circuits instantiated. Examples of vulnerable paths may include paths that experience significant cross talk noise, paths that cover a large area of the IC 10 and thus may be more vulnerable to cross chip variations, etc.

Paths that are vulnerable may be more likely to be causes of failure during post silicon validation, when the integrated circuit has been fabricated and is being tested. Previously, the paths would be identified as failing in the post-silicon validation, and the integrated circuit design may be modified to correct the path. However, the ability to continue testing and identify other potential issues may be limited by the failing path until the revised design has been fabricated, introducing delay and cost into the post-silicon validation process. If the paths are identified as failing and the paths have programmable clocked circuits on them, the clock delays in the programmable clocked circuits may be programmed to overcome the failing path, allowing the path to function correctly. This may allow post silicon validation to progress further, identifying other issues that may be masked by the failing paths, without waiting for a revised integrated circuit to be manufactured.

Even further, the inclusion of the programmable clocked circuits may be used for yield improvement for the integrated circuit. If a given path is failing in the final design of the integrated circuit more frequently than desired (reducing the yield of functional integrated circuits that can be used in products), and the given path has programmable clocked circuits, the failure may be overcome by changing the programming of the programmable clocked circuits so that the paths meet timing requirements.

Figure 1:
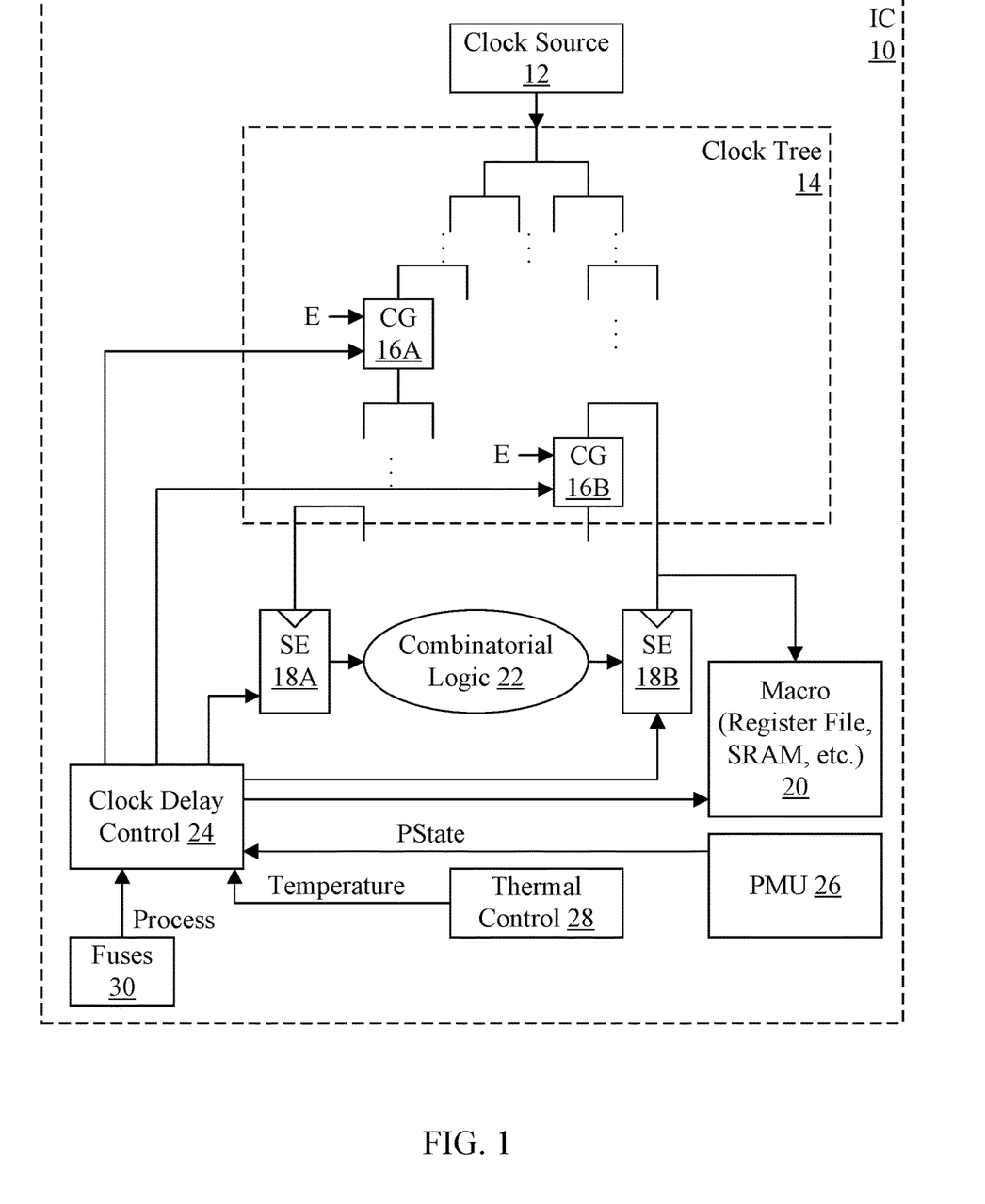
FIG. 1 is a block diagram of one embodiment of an integrated circuit.

Turning now to FIG. 1, a block diagram of one embodiment of an integrated circuit 10 that includes one or more programmable clocked circuits is shown. In the illustrated embodiment, the integrated circuit 10 includes a clock source 12 coupled to a clock tree 14 which distributes the clock over the integrated circuit 10. While one clock is shown in the embodiment of FIG. 1, any number of clocks (potentially operating at different clock frequencies, for example) may be used in other embodiments. Generally, the clock tree 14 may include one or more levels or nodes of buffering to drive the clock across the area occupied by the IC 10. Thus, while the clock tree 14 is shown as a block in FIG. 1, clock tree 14 may physically be spread out over the area covered by the IC 10, among the functional circuitry that is clocked by the clocks supplied by the clock tree 14. The clock tree 14 may be balanced, so that the skew between clock signals at various leaf nodes of the clock tree 14 (the outputs to the sequential elements, macros, etc.) is minimized.

The clock source 12 may be any type of clock generation circuitry, in various embodiments. For example, the clock source 12 may include one or more phase locked loops (PLLs) that generate the clock or clocks from a reference clock and lock the phase to the reference clock. The clock source 12 may include one or more delay locked loops (DLLs) that generate the clock or clocks from a reference clock and lock the phase to the reference clock. One or more clock multipliers or clock dividers may be used. In other embodiments, the clock source 12 may simply be an input to the integrated circuit 10.

The clock tree 14 may include one or more clock gater circuits (more briefly "clock gaters" or "CG" in FIG. 1) which may gate the clock at a given level (or node) in the clock tree. For example, the clock tree 14 in FIG. 1 includes a clock gater circuit 16A that gates one or more levels of the clock tree 14 that are fed by the clock gater circuit 16A, as well as a clock gater circuit 16B that is at a leaf node of the clock tree and may be directly connected to a clock input on one or more clocked circuits. The clock gater circuits 16A-16B have an enable input in addition to the clock input. The enable input is labeled "E" in FIG. 1. The enable may be asserted to cause the clock to gate and deasserted to permit the clock to toggle (or vice versa). Control logic, not shown, may monitor the circuitry that is clocked by the clock gater 16A or 16B to determine when to enable/disable the gating.

The clock gaters 16A-16B may be programmable clocked circuits in this embodiment, and thus are coupled to a delay control circuit 24. The delay control circuit 24 may be configured to provide delay values for the clock gaters 16A-16B as discussed below. In other embodiments, there may be clock gaters 16A-16B that are do not have programmable clock delays as well, or one of the clock gaters 16A-16B may have a programmable clock delay while the other clock gater 16A-16B does not. There may also be embodiments in which none of the clock gaters 16A-16B have programmable clock delays (e.g. other clocked circuits in the integrated circuit 10 may have programmable clock delays).

The leaf nodes of the clock tree 14 may be coupled to the clock inputs on various sequential elements such as the sequential elements 18A-18B shown in FIG. 1, as well as various custom macros 20 that may be included in the integrated circuit 10. The sequential elements 18A-18B may have data inputs generated by combinatorial logic circuitry (e.g. the data input of the sequential element 18B may be generated by the combinatorial logic circuit 22 shown in FIG. 1) and may have data outputs that launch data into the combinatorial logic circuitry to evaluate into data inputs for other sequential elements (e.g. the sequential element 18A may have a data output coupled to the combinatorial logic circuit 22 in FIG. 1). The data output of the sequential element 18A, through the combinatorial logic circuit 22 to the data input of the sequential element 18B may be a timing path that may be required to meet timing at the various operating states, temperatures, and process corners.

In the illustrated embodiment, both the sequential elements 18A-18B have programmable clock delays and thus are coupled to the clock delay control circuit 24. The clock delay circuit 24 may provide delay values as discussed below. In other embodiments, only one of the sequential elements 18A-18B may have a programmable clock delay and the other sequential element 18A-18B may not have a programmable clock delay. Still further, there may be embodiments in which none of the sequential elements 18A-18B have a programmable clock delay (e.g. other clocked circuits in the integrated circuit 10 may have a programmable clock delay).

While one combinatorial logic circuit 22 is shown in FIG. 1, between the sequential elements 18A-18B, generally the integrated circuit 10 may include a plurality of the sequential elements 18A-18B and the combinatorial logic circuits 22 between them. For example, a typical integrated circuit 10 may include tens of thousands of sequential elements or even hundreds of thousands of sequential elements, with combinatorial logic circuits between them. Generally, the combinatorial logic circuits 22 may include various digital logic circuits (e.g. logic gates) that implement a desired logic operation of the integrated circuit 10.

The custom macro(s) 20 in FIG. 1 are also shown to have a variable clock delay, and thus are coupled to the clock delay control circuit 24. Similar to the above discussion, other embodiments may have one or more custom macros 20 that have variable clock delays while other ones of the custom macros 20 do not have variable clock delays. Still further, other embodiments may have no custom macros 20 that have variable clock delays (e.g. other clocked circuits in the integrated circuit 10 may have a programmable clock delay).

The clock delay control circuit 24 is configured to generate the delay values for the programmable clocked circuits in the integrated circuit 10 (e.g. the clock gaters 16A-16B, the sequential elements 18A-18B, and the custom macros 20 in the illustrated embodiment). More particularly, the clock delay control circuit 24 may receive inputs that identify the current operating state ("PState" in FIG. 1), the current temperature, and the process corner ("Process" in FIG. 1) that was in effect at manufacture of the integrated circuit 10. Based on the inputs, the clock delay control circuit 24 may generate the delay values. The delay values may be based on the timing analysis that was performed during the design of the integrated circuit 10. That is, for a given combination of operating state, temperature, and/or process corner, a specific delay selection may permit the timing path to meet timing according to the timing analysis. Other combinations of operating state, temperature, and/or process corner may result in different delay selections that may meet timing for those combinations. The clock delay control circuit 24 may be designed to generate the delay values determined from the static timing analysis. Viewed in another way, the clock delay control circuit 24 may map combinations of the PState, temperature, and/or process corner to one or more delay values for the programmable clocked circuits in the IC 10. The mapping may be predetermined based on the results of static timing analysis performed during a design of the IC 10.

In the illustrated embodiment, a power management unit (PMU) 26 may provide the PState input to the clock delay control circuit 24. The PMU 26 may control the PState for various circuits in the integrated circuit 10. In general, the PState may be a combination of clock frequency and supply voltage magnitude being supplied to the integrated circuit 10 or a portion of the integrated circuit 10. Based on the PState that applies to the programmable clocked circuits in the integrated circuit 10, the clock delay control circuit 24 may generate corresponding delay values. In an embodiment, there may be multiple PStates for different subsets of the programmable clocked storage devices. For example, an IC 10 may include multiple processors that may be operating at different PStates. An IC 10 may include other circuits (e.g. various peripheral circuits if the IC 10 is an SOC) that may operate at different PStates from each other and/or the one or more processors. The clock delay circuit 24 may receive each PState that applies to one or more programmable clocked circuits in the IC 10 may be configured to generate corresponding delay values based on the respective PStates. The PMU 26 may also be referred to as a dynamic voltage and frequency management (DVFM) controller or unit.

The IC 10 may include a thermal control circuit (or thermal controller) 28 which may identify the temperature in the IC 10. The thermal control circuit 28 may include one or more temperature sensors, which may be distributed across the area occupied by the integrated circuit 10, to measure temperature. The temperature control circuit 28 may capture the temperature measurements periodically, and may generate the temperature identification for the clock delay control circuit 24. The identified temperature may be the maximum detected temperature, a combination of the measured temperatures (e.g. an average), or may be selected to be the temperature of the temperature sensors that are physically nearest to the programmable clocked circuits controlled by the clock delay control circuit 24. In an embodiment, a portion of the thermal controller 28 may be implemented in software that executes on one or more processors in the IC 10. The instructions implementing the software may be stored on a non-transitory computer accessible storage medium that may be part of the thermal controller 28. In other embodiments, the thermal controller 28 may provide a temperature input to the PMU/DVFM controller 26, which may determine if a different PState may be appropriate to reduce the temperature. In some such embodiments, the temperature may not be provided directly to the clock delay control circuit 24. Alternatively, the temperature may remain in input to the clock delay control circuit 24 in other embodiments, in addition to potentially affecting the PState.

The clock delay control circuit 24 may also generate the delay values based on the process corner. The process corner may be fixed for a given instance of the integrated circuit 10, and may be recorded in a manner that is accessible to the clock delay control circuit 24. For example, in the illustrated embodiment, the IC 10 includes a set of fuses 30 that may be selectively blown during manufacture to record various values for the IC 10. One or more of the fuses 30 may be selectively blown to identify the process corner that was in effect at the time the IC 10 was manufactured. The fuses 30 may be coupled to the clock delay control circuit 24 may identify the process corner.

In the embodiment of FIG. 1, the clock delay control circuit 24 is shown having individual connections to the clock gater circuits 16A-16B, the sequential elements 18A-18B, and the macros 20. That is, each programmable clocked circuit in the embodiment of FIG. 1 may receive a unique delay value. Such an implementation may simplify the implementation of the clock delay selection in the programmable clocked circuits. Since each circuit receives a unique delay, simple decoding may be implemented to determine the selected delay. In some cases, no decoding may be implemented and the delay value may directly control the delay selection circuitry. However, the routing of the individual delay values to each programmable clocked circuit may be challenging and/or costly to implement.

Figure 2:
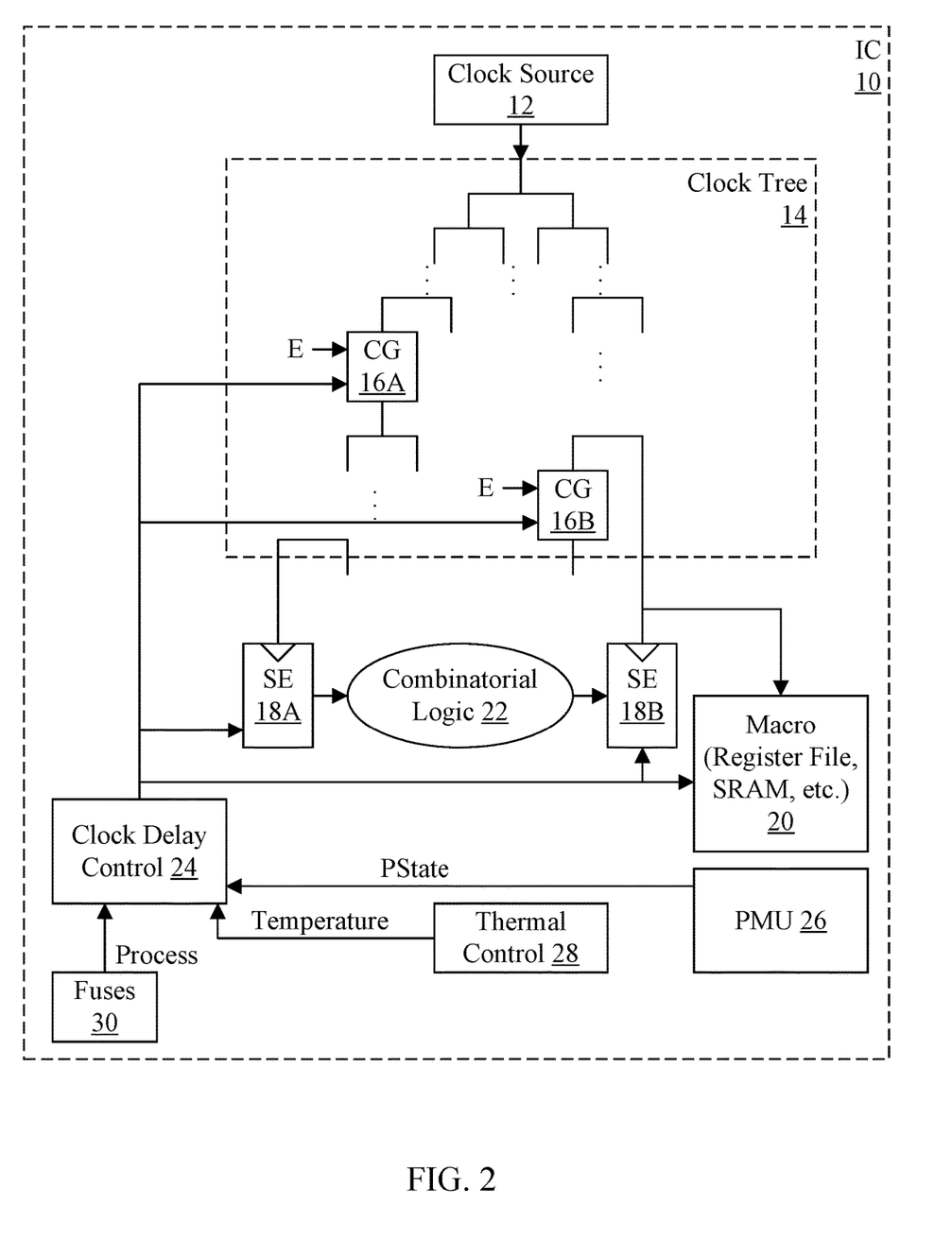
FIG. 2 is a block diagram of another embodiment of an integrated circuit.

FIG. 2 is another embodiment of the integrated circuit 10. The embodiment shown in FIG. 2 is generally similar to the embodiment of FIG. 1, and the discussion above applies. In this embodiment, however, a global clock delay control is distributed to the programmable clocked circuits. The global clock delay control represents the combination of operating state (PState), temperature, and process corner that is currently in effect during operation. Each programmable clocked circuit in this embodiment may decode the global clock delay control to the correct selection for the that programmable clocked circuit. Thus, each programmable clocked circuit in this embodiment may include a custom decode circuit that is designed based on the selected delay for each combination of PState, temperature, and process corner. That is, the same underlying programmable clock circuit (which may provide one or more predefined delays) may have a different decode circuit than another instance of the programmable clock circuit if a different delay would be selected for the same combination of PState, temperature, and process corner. The embodiment of FIG. 2 may include additional circuitry at the programmable clocked circuits, but the routing of the delay value may be less challenging/costly than the embodiment of FIG. 1.

Other embodiments may use a combination of the global delay value distribution and the unique value distribution. For example, a subset of the programmable clocked circuits may receive a global value while others receive unique values. Alternatively, more than one global value may be transmitted. A given programmable clocked circuit may receive one of the global values, and may decode it to determine the selected delay. Such an embodiment may allow more variation in the selected delays than a single global value (and/or may simplify the decode circuitry in the programmable clocked circuits) but may not require as much routing cost as the full unique value solution.

It is noted that, while some embodiments may include operating state, temperature, and process corner in determining delay values for the programmable clocked circuits, other embodiments may employ subsets of the above depending on which factors contribute to the paths that employ the programmable clocked circuits to meet timing. For example, in some cases, the paths may not be sensitive enough to temperature to need the temperature input. Other embodiments may eliminate the process corner input or the operating state input, if not required. Any combination of factors may be used in various embodiments.

Figure 3:
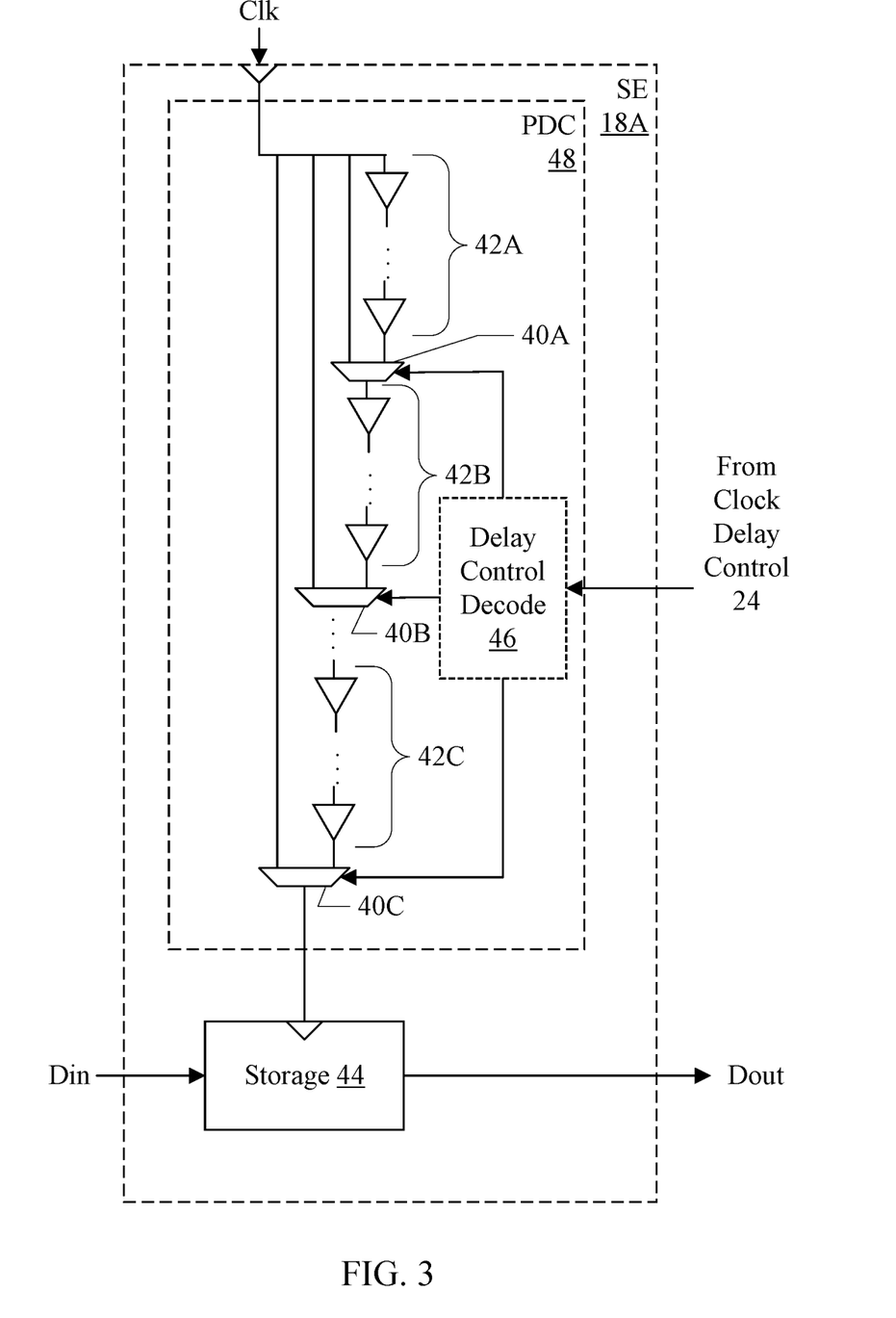
FIG. 3 is a block diagram of one embodiment of a sequential element.

FIG. 3 is a block diagram illustrating one embodiment of the sequential element 18A. The sequential element 18B, and other sequential elements that include programmable clock delay, may be similar. In the illustrated embodiment, the sequential element 18A includes a clock input Clk, a data input Din, and a data output Dout.

The clock input is coupled to a programmable delay circuit (PDC) 48 in the sequential element 18A. The embodiment of the PDC 48 shown in FIG. 3 illustrates the clock input coupled to an input of a set of multiplexors (muxes) 40A-40C and to a delay chain 42A. The delay chain 42A is another input to the mux 40A, which has an output coupled to a delay chain 42B. There may be additional delay chains and muxes coupled in a similar fashion (as indicated by the ellipses in FIG. 3), up to the delay chain 42C which is an input to the mux 40C. Alternatively, the output of the mux 40B may be coupled to the input of the delay chain 42C. Embodiments employing only two delay chains and muxes, or only one delay chain and mux, are also possible. The output of the mux 40C is coupled to an internal clock input to the sequential element storage 44, which captures and stores the data input responsive to the internal clock input and which launches the data output in response to the internal clock input. Together, the delay chains 42A-42C, the muxes 40A-40C, and the optional delay control decode circuit 46 may form the PDC 48.

By controlling the inputs to the muxes 40A-40C, various delays may be selected. For example, if each mux 40A-40C selects its delay chain input, a delay equal to the sum of the delays of the delay chains 42A-42C and the muxes 40A-40C may be applied to the clock input to generate the delayed clock on the internal input. If mux 40C selects the clock input, then a delay that approximates zero may be applied (e.g. only the delay through the mux 40C may be incurred). If other muxes 40A-40B select the clock input, then delays between the sum of all the delay chains 42A-42C and zero may be applied. For example, if the mux 40A selects the clock input and the mux 40B selects the delay chain 42B (and if there are not any additional muxes and delay chains in the circuit), then the delay would be the sum of the delays of the delay chains 42B-42C and the muxes 40A-40C.

Optionally, a delay control decode circuit 46 may be provided in the PDC 48 to decode the delay value from the clock delay control circuit 24 to generate the mux selects for the muxes 40A-40C. The delay control decode circuit 46 may be designed during the timing analysis phase of the design, based on the delay value that will be provided and the desired delay that maps to that delay value. The delay control decode circuit 46 may be coupled to the delay control circuit 24 and may receive the delay value, and may be coupled to the mux selects for the muxes 40A-40C to control the selected delay. In some embodiments, the delay control decode circuit 46 may not be needed (e.g. if individual delay values are provided similar to FIG. 1 and the delay values are provided in the form of mux select controls rather than an encoded value).

The delay chains 42A-42C may be designed to have approximately the same delays, or different amounts of delay may be employed for one or more of the delay chains 42A-42C as compared to other ones of the delay chains 42A-42C. In an embodiment, each delay chain 42A-42C may have a different delay. Any combination of delays may be implemented as desired in various embodiments. Generally, each delay chain may include one or more buffers that has a specified amount of delay. For example, a buffer may be formed from a series connection of two inverters in complementary metal-oxide-semiconductor (CMOS) logic.

Other embodiments may use different structures than the mux and delay chain structure for the PDC 48 shown in FIG. 3. Any circuitry that may provide differing amounts of delay for different control signal inputs may be used. In some embodiments, the wiring that couples the delay chains 42A-42C and the muxes 40A-40C may be designed to control delay as well. For example, varying the width, length, or other parameters of the wire may affect the amount of delay in a given path and may allow for additional flexibility and granularity in the delays that may be available in different instances of the programmable delay circuits. Additionally, in some embodiments, the PDC 48 may be a separate circuit (e.g. separate standard cell) from the SE 18A. Instances of the PDC 48 may be instantiated near the SEs 18A-18B for which they provide delay control, for example. In some embodiments, instances of the PDC 48 may be shared by subsets of the SEs 18A-18B, CGs 16A-16B, and/or macros 20.

Figure 4:
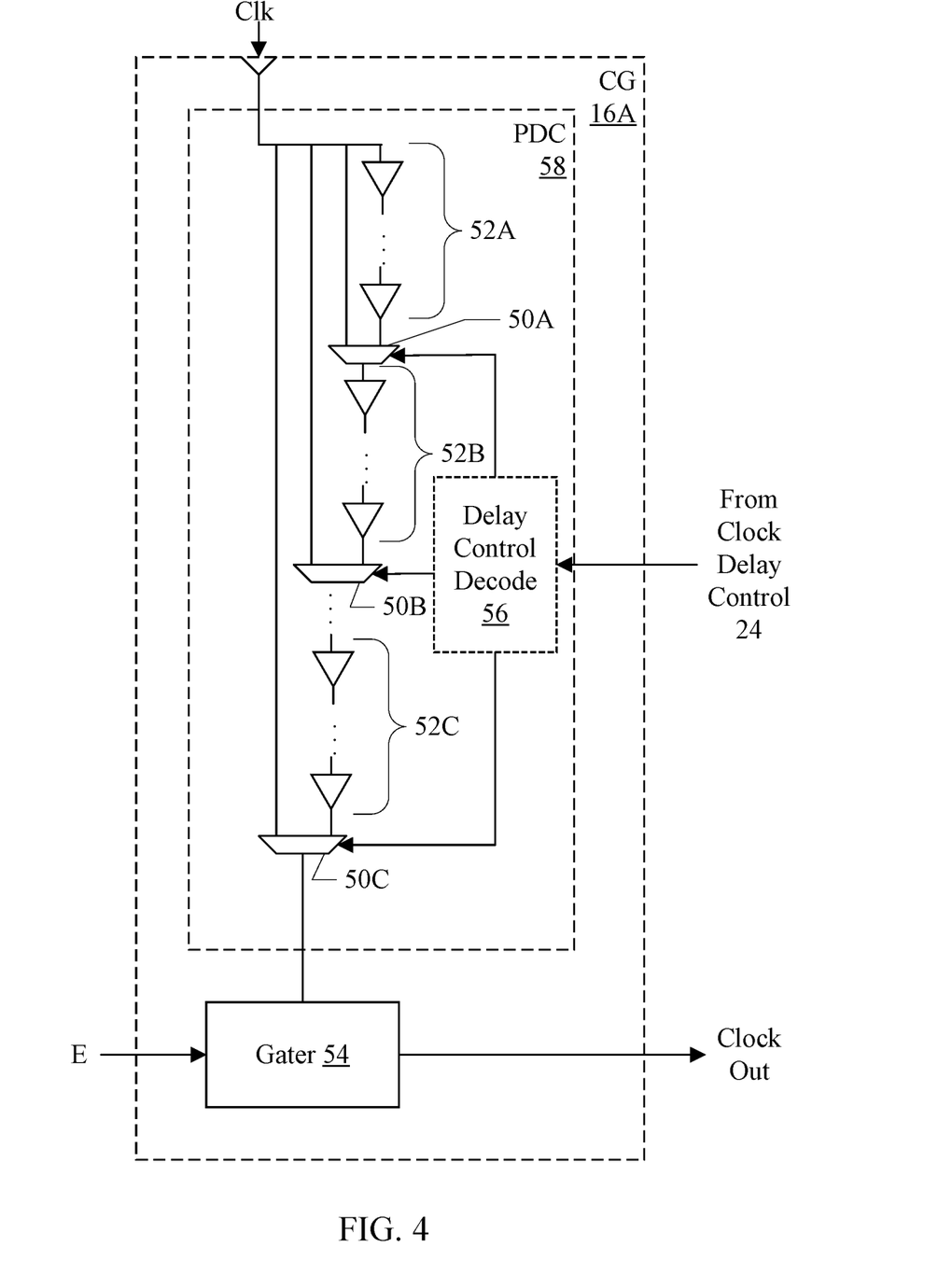
FIG. 4 is a block diagram of one embodiment of a clock gater circuit.

FIG. 4 is a block diagram illustrating one embodiment of the clock gater 16A. The clock gater 16B, and other clock gaters that include programmable clock delay, may be similar. In the illustrated embodiment, the clock gater 16A includes a clock input Clk, an enable input E, and a clock output Clock Out.

Similar to the discussion above with regard to the sequential element 18A, the clock input to the clock gater 16A is coupled to a programmable delay circuit (PDC) 58 in the clock gate 16A. The embodiment of the PDC 58 shown in FIG. 4 illustrates the clock input coupled to the input of a set of multiplexors (muxes) 50A-50C and to a delay chain 52A. The delay chain 52A is another input to the mux 50A, which has an output coupled to a delay chain 52B. There may be additional delay chains and muxes coupled in a similar fashion (as indicated by the ellipses in FIG. 4), up to the delay chain 52C which is an input to the mux 50C. Alternatively, the output of the mux 50B may be coupled to the input of the delay chain 52C. Embodiments employing only two delay chains and muxes, or only one delay chain and mux, are also possible. The output of the mux 50C is coupled to an internal clock input to the gater circuit 54. The gater circuit 54 receives the enable input, and is configured to conditional gate the clock output based on the enable. Together, the delay chains 52A-52C, the muxes 50A-50C, and the optional delay control decode circuit 56 may form the PDC 58.

By controlling the inputs to the muxes 50A-50C, various delays may be selected. For example, if each mux 50A-50C selects its delay chain input, a delay equal to the sum of the delays of the delay chains 52A-52C and the muxes 50A-50C may be applied to the clock input to generate the delayed clock on the internal input to the gater circuit 54. If mux 50C selects the clock input, then a delay that approximates zero may be applied (e.g. only the delay through the mux 50C may be incurred). If other muxes 50A-50B select the clock input, then delays between the sum of all the delay chains 52A-52C and zero may be applied. For example, if the mux 50A selects the clock input and the mux 50B selects the delay chain 52B (and if there are not any additional muxes and delay chains in the circuit), then the delay would be the sum of the delays of the delay chains 52B-52C and the muxes 50A-50C.

Optionally, a delay control decode circuit 56 may be provided in the PDC 58 to decode the delay value from the clock delay control circuit 24 to generate the mux selects for the muxes 50A-50C. The delay control decode circuit 56 may be designed during the timing analysis phase of the design, based on the delay value that will be provided and the desired delay that maps to that delay value. The delay control decode circuit 56 may be coupled to the delay control circuit 24 and may receive the delay value, and may be coupled to the mux selects for the muxes 50A-50C to control the selected delay. In some embodiments, the delay control decode circuit 56 may not be needed (e.g. if individual delay values are provided similar to FIG. 1 and the delay values are provided in the form of mux select controls rather than an encoded value).

The delay chains 52A-52C may be designed to have approximately the same delays, or different amounts of delay may be employed for one or more of the delay chains 52A-52C as compared to other ones of the delay chains 52A-52C. In an embodiment, each delay chain 52A-52C may have a different delay. Any combination of delays may be implemented as desired in various embodiments. Generally, each delay chain may include one or more buffers that has a specified amount of delay. For example, a buffer may be formed from a series connection of two inverters in complementary metal-oxide-semiconductor (CMOS) logic.

Other embodiments may use different structures than the mux and delay chain structure for the PDC 58 shown in FIG. 4. Any circuitry that may provide differing amounts of delay for different control signal inputs may be used. In some embodiments, the wiring that couples the delay chains 52A-52C and the muxes 50A-50C may be designed to control delay as well. For example, varying the width, length, or other parameters of the wire may affect the amount of delay in a given path and may allow for additional flexibility and granularity in the delays that may be available in different instances of the programmable delay circuits. Additionally, in some embodiments, the PDC 58 may be a separate circuit (e.g. separate standard cell) from the clock gater 16A. Instances of the PDC 5 may be instantiated near the CGs 16A-16B for which they provide delay control, for example. In some embodiments, instances of the PDC 58 may be shared by subsets of the SEs 18A-18B, CGs 16A-16B, and/or macros 20.

Figure 5:
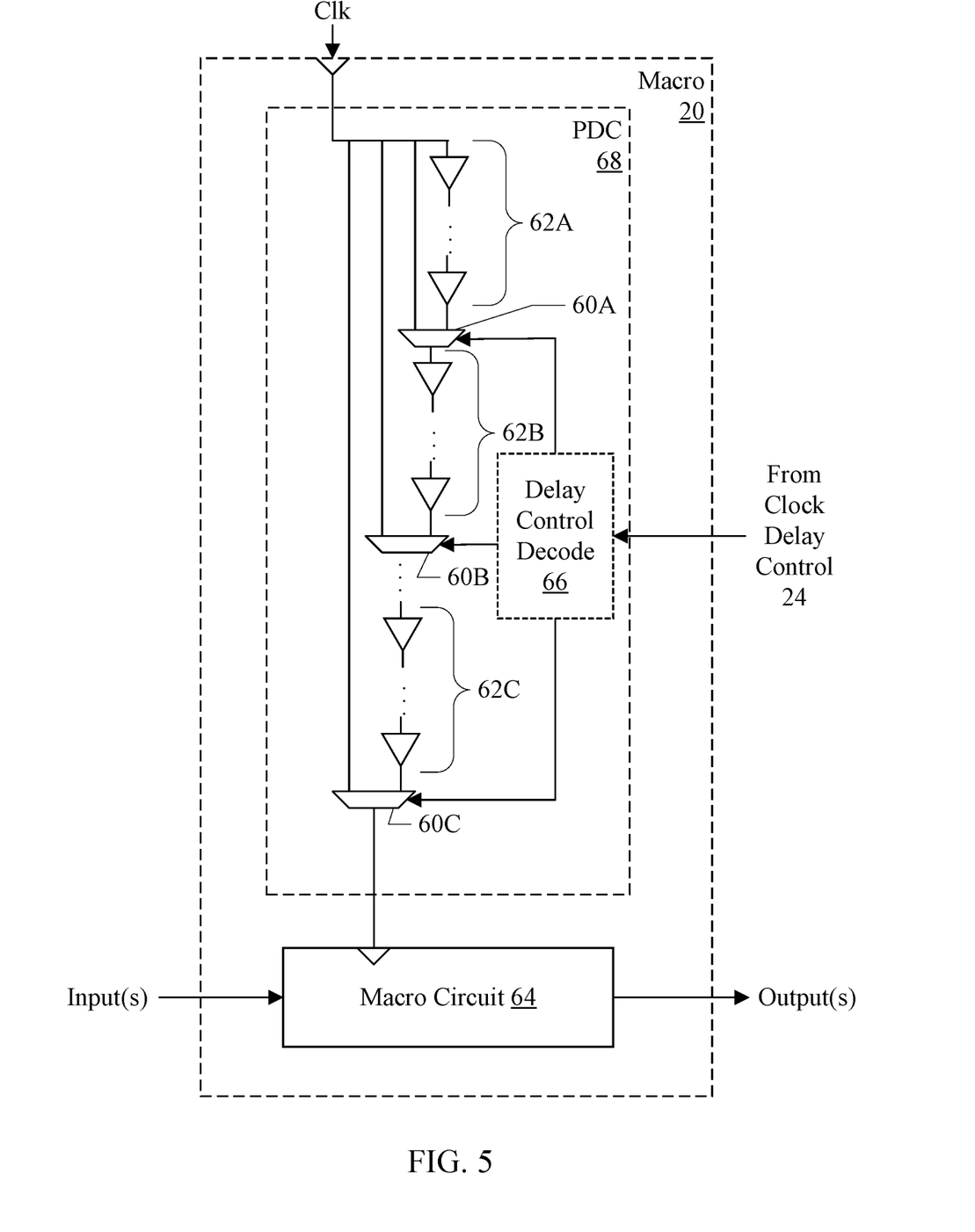
FIG. 5 is a block diagram of one embodiment of a macro.

FIG. 5 is a block diagram illustrating one embodiment of the macro 20. In the illustrated embodiment, the clock gater 16A includes a clock input Clk, one or more other inputs (Input(s) in FIG. 5) and one or more outputs (Output(s) in FIG. 5).

Similar to the discussion above with regard to the sequential element 18A, the clock input to the macro 20 is coupled to a programmable delay circuit (PDC) 68 in the macro 20. The embodiment of the PDC 68 shown in FIG. 5 illustrates the clock input coupled to the input of a set of multiplexors (muxes) 60A-60C and to a delay chain 62A. The delay chain 62A is another input to the mux 60A, which has an output coupled to a delay chain 62B. There may be additional delay chains and muxes coupled in a similar fashion (as indicated by the ellipses in FIG. 5), up to the delay chain 62C which is an input to the mux 60C. Alternatively, the output of the mux 60B may be coupled to the input of the delay chain 62C. Embodiments employing only two delay chains and muxes, or only one delay chain and mux, are also possible. The output of the mux 60C is coupled to an internal clock input to the macro circuit 64. The macro circuit 64 implements the macro functionality. For example, if the macro 20 is a register file, the Input(s) may one or more read ports and one or more write ports. The read ports may include a register address and enable, and the Output(s) may include data read from the register. The write ports may include a register address and enable, and write data. Other macros 20 may have other sets of inputs and outputs, as defined for the macro 20. Together, the delay chains 62A-62C, the muxes 60A-60C, and the optional delay control decode circuit 66 may form the PDC 68.

By controlling the inputs to the muxes 60A-60C, various delays may be selected. For example, if each mux 60A-60C selects its delay chain input, a delay equal to the sum of the delays of the delay chains 62A-62C and the muxes 60A-60C may be applied to the clock input to generate the delayed clock on the internal input to the macro circuit 64. If mux 60C selects the clock input, then a delay that approximates zero may be applied (e.g. only the delay through the mux 60C may be incurred). If other muxes 60A-60B select the clock input, then delays between the sum of all the delay chains 62A-62C and zero may be applied. For example, if the mux 60A selects the clock input and the mux 60B selects the delay chain 62B (and if there are not any additional muxes and delay chains in the circuit), then the delay would be the sum of the delays of the delay chains 62B-62C and the muxes 60A-60C.

Optionally, a delay control decode circuit 66 may be provided in the PDC 68 to decode the delay value from the clock delay control circuit 24 to generate the mux selects for the muxes 60A-60C. The delay control decode circuit 66 may be designed during the timing analysis phase of the design, based on the delay value that will be provided and the desired delay that maps to that delay value. The delay control decode circuit 66 may be coupled to the delay control circuit 24 and may receive the delay value, and may be coupled to the mux selects for the muxes 60A-60C to control the selected delay. In some embodiments, the delay control decode circuit 66 may not be needed (e.g. if individual delay values are provided similar to FIG. 1 and the delay values are provided in the form of mux select controls rather than an encoded value).

The delay chains 62A-62C may be designed to have approximately the same delays, or different amounts of delay may be employed for one or more of the delay chains 62A-62C as compared to other ones of the delay chains 62A-62C. In an embodiment, each delay chain 62A-62C may have a different delay. Any combination of delays may be implemented as desired in various embodiments. Generally, each delay chain may include one or more buffers that has a specified amount of delay. For example, a buffer may be formed from a series connection of two inverters in complementary metal-oxide-semiconductor (CMOS) logic.

Other embodiments may use different structures than the mux and delay chain structure for the PDC 68 shown in FIG. 5. Any circuitry that may provide differing amounts of delay for different control signal inputs may be used. In some embodiments, the wiring that couples the delay chains 62A-62C and the muxes 60A-60C may be designed to control delay as well. For example, varying the width, length, or other parameters of the wire may affect the amount of delay in a given path and may allow for additional flexibility and granularity in the delays that may be available in different instances of the programmable delay circuits. Additionally, in some embodiments, the PDC 68 may be a separate circuit (e.g. separate standard cell) from the macro 20. Instances of the PDC 68 may be instantiated near the macro(s) 20 for which they provide delay control, for example. In some embodiments, instances of the PDC 68 may be shared by subsets of the SEs 18A-18B, CGs 16A-16B, and/or macros 20.

Figure 6:
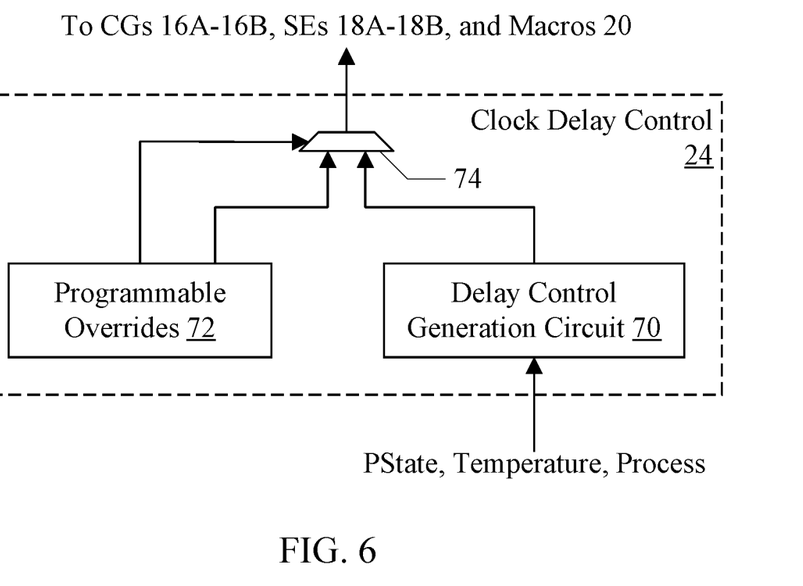
FIG. 6 is a block diagram of one embodiment of a clock delay control circuit.

FIG. 6 is a block diagram of one embodiment of the clock delay control circuit 24 in greater detail. In the illustrated embodiment, the clock delay control circuit 24 includes a delay control generation circuit 70 and a set of programmable overrides 72. An output of the delay control generation circuit 70 and an output of the programmable overrides are provided to a mux 74, and the select control for the mux 74 is coupled to the programmable overrides 72. The output of the mux 74 is the delay value or values to be provided to the clock gaters 16A-16B, the sequential elements 18A-18B, and the macros 20. The delay control generation circuit 70 is coupled to the PState, temperature, and process corner inputs from the PMU 26, the thermal controller 28, and the fuses 30, respectively.

The delay control generator circuit 70 may be designed during the timing analysis phase, as the programmable clocked circuits are instantiated and the delay selections for various combinations of the PState, temperature, and/or process corners are determined. The delay control generator circuit 70 may include combinatorial logic, state machines, clocked storage such as sequential elements, etc. to determine the delay value or values to be transmitted to the programmable clocked circuits. In an embodiment, the delay control generator circuit 70 may be coded in a hardware description language and synthesized, similar to other logic circuitry in the integrated circuit 10. The delay control generator circuit 70 may map the combinations of PState, temperature, and/or process corner to the delay selections.

The programmable overrides 72 may provide the ability to override one or more delays for post-silicon validation and/or yield improvement, as described above. That is, if a path is failing and the delay to one or more of the programmable clocked circuits may be changed to permit the path to pass, the programmable overrides 72 may be used to change the delay. The programmable overrides 72 may be programmed with the delay value to provide, and an enable may be set to select the override in place of the delay value from the delay control generation circuit 70. Thus, the mux 74 may be representative of multiple muxes 74, one for each delay value that may be overridden. Some delay values may not be overridden and may not include the mux 74 in the path for those delay values (e.g. the output of the delay control generation circuit 70 may be output directly to the programmable clocked circuits).

Figure 7:
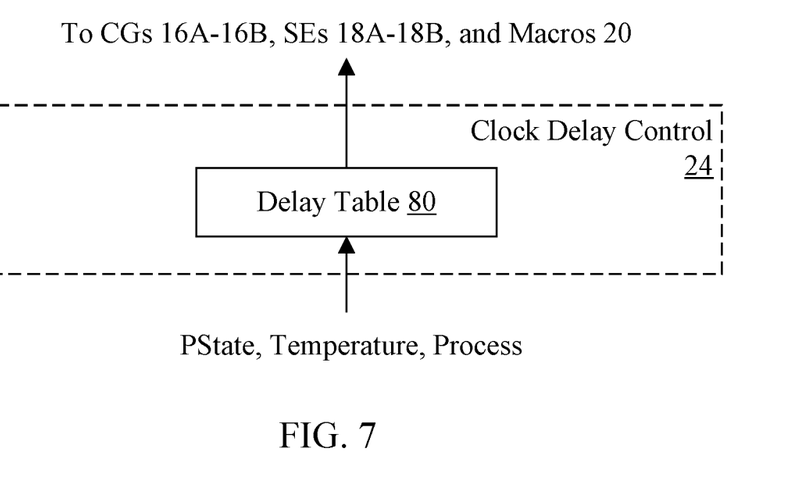
FIG. 7 is a block diagram of another embodiment of a clock delay control circuit.

FIG. 7 is a block diagram of another embodiment of the clock delay control circuit 24. In the embodiment of FIG. 7, a delay table 80 may be provided which may be programmed with the delay values to be output for various combinations of the PState, temperature, and process corner inputs. That is, the PState, temperature, and process corner inputs may serve as an index into the delay table 80, which may output one or more delays to the clock gaters 16A-16B, sequential elements 18A-18B, and macros 20.

Since incorrect values in the delay table 80 may lead to malfunction in the integrated circuit 10, the delay table 80 may be programmed with the delay values in a secure fashion, so that only the validly-determined delays are provided in the table. In an embodiment, the delays may be provided from a secure, on-chip non-volatile memory, for example. The delay table 80 may still support overrides for post-silicon validation and/or yield improvement. In this case, the source of the data for the delay table 80 may be updated with the overrides. The programming of overrides may also be protected by a secure mechanism to prevent invalid delays from being provided, which could cause erroneous operation.

Figure 8:
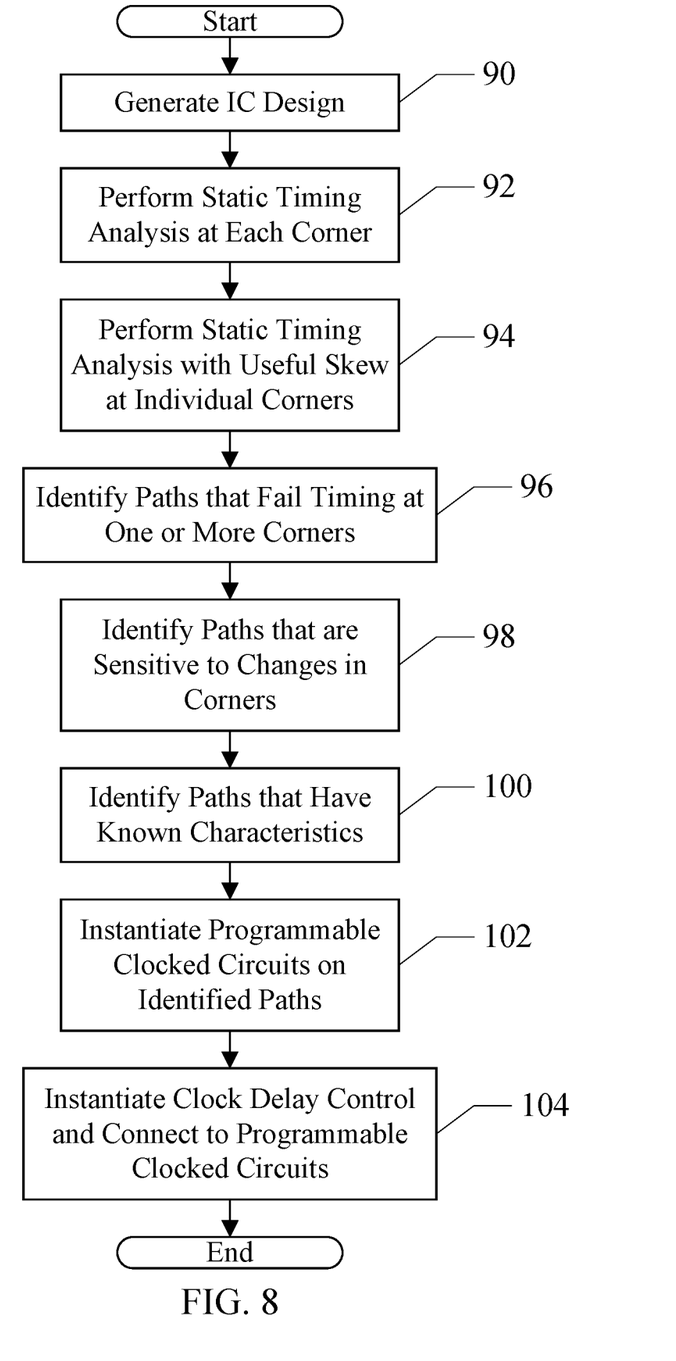
FIG. 8 is a flowchart illustrating a timing closure method.

FIG. 8 is a flowchart illustrating one embodiment of at least a portion of a method for designing the integrated circuit 10. While the blocks are shown in a particular order for ease of understanding, other orders may be used. Blocks may be performed in parallel and/or may be iterated as desired to achieve the final design of the IC 10 that is to be fabricated.

The designers may generate a design of the IC 10 (block 90). Generating the design may include coding the design in a hardware description language and synthesizing the design using a library of standard cells and/or custom designing circuitry using schematic capture tools. The library of standard cells may include various instances of the clock gaters 16A-16B and the sequential elements 18A-18B with different configurations of programmable clock delay. Initially, however, the synthesis tool may select clock gaters 16A-16B and sequential elements 18A-18B that do not include the programmable delay. The macros 20 may be instantiated in the design without programmable delay as well, and may be replaced by macros with programmable delay as needed.

The designers may perform static timing analysis (STA) on the design, using parameters that specify each process corner as well as combinations of the operating state (PState) and temperature (block 92). The designers may also perform static timing analysis on the design at individual corners (process, operating state, and temperature) with the useful skewing option selected (block 94). Useful skewing may be an option that some STA tools support in which the tools attempt to identify clock skewing (e.g. intentional insertion of clock delay) on certain sequential elements that may improve the timing characteristics of paths that include those sequential elements. Typically, the useful skewing is performed across all the corners, and only identifies skewing that benefits a path across all the corners (or that minimally worsens a path at one or more corners while benefiting the path at one or more other corners). By running the useful skewing on individual corners, skewing that may benefit a path at one corner may be identified. The per-corner useful skewing results may help identify paths which could benefit from programmable clocked circuits such as those described herein.

The designers may analyze the static timing results from the static timing analysis performed at blocks 92 and 94, identifying paths that fail to meet timing at one or more corners (block 96). Paths that fail to meet timing at all corners, or most corners, may be solved using traditional tuning techniques. However, paths that are sensitive to changes in corners may be identified (block 98). That is, paths that meet timing at most corners but fail at particular corners, or paths for which timing varies significantly based on changes in corners, may be identified. Such paths may benefit from the use of programmable clocked circuits. Additionally, the paths may be analyzed to identify paths that have known characteristics that have caused unexpected timing failures in the past (block 100). For example, paths that may be subject to significant cross talk noise may be identified.

The designers may instantiate the programmable clocked circuits on the identified paths, replacing clock gaters, sequential elements, or macros with corresponding circuits that include programmable delays on the clock input (block 102). Different instances of the programmable clocked circuits may have different configurations of the programmable delay circuit, based on the needs of the particular path. For example, if a path needs 20 picoseconds of delay at one corner, and 60 picoseconds of delay at another corner, a programmable delay circuit may be selected that may provide both 20 picoseconds of the delay and 60 picoseconds of delay based on different values on the delay input. A different programmable delay circuit may be selected for another path having different delay requirements.

The clock delay control circuit 24 may be instantiated and connected to the programmable clocked circuits (block 104). In one embodiment, the clock delay control circuit 24 may be programmed in a hardware description language and synthesized, similar to other parts of the IC 10. Alternatively, if the clock delay control circuit 24 is implemented as a table, the circuit may be instantiated and the outputs connected to the programmable clocked circuits.

Figure 9:
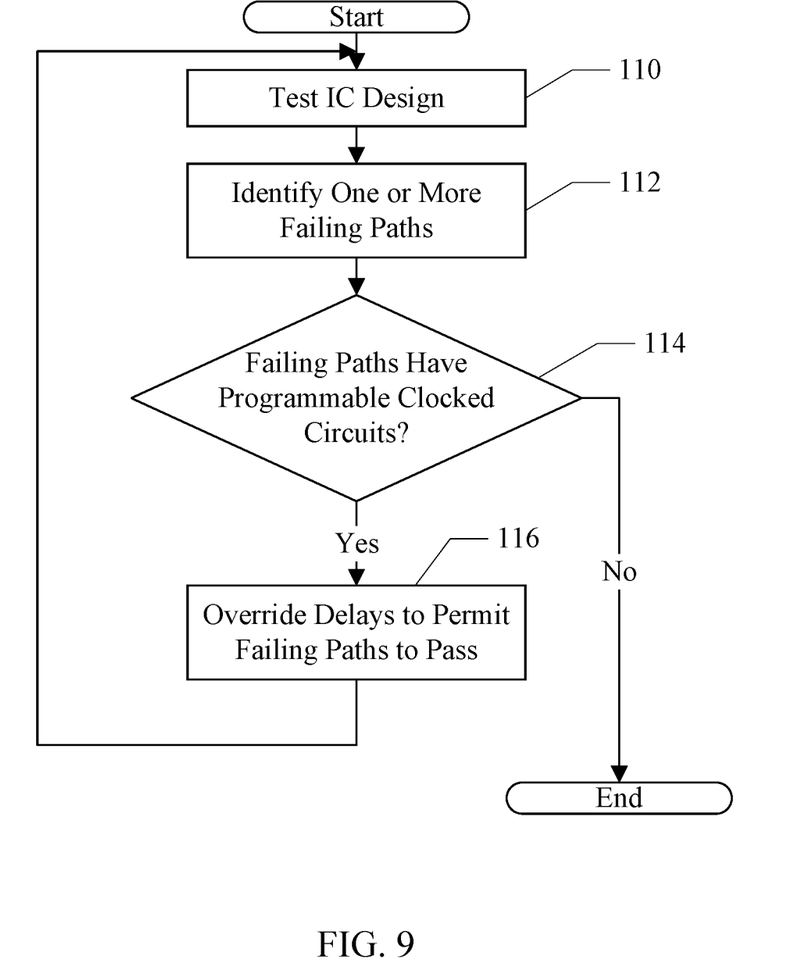
FIG. 9 is a flowchart illustrating a post silicon validation method.

FIG. 9 is a flowchart illustrating one embodiment of at least a portion of a method for post-silicon validation of the integrated circuit 10. While the blocks are shown in a particular order for ease of understanding, other orders may be used. Blocks may be performed in parallel and/or may be iterated as desired to complete the validation of the IC 10.

The IC 10 may be tested using various test patterns developed during the design phase, that stress various paths in the IC 10 (block 110). If one or more tests fail, then one or more failing paths may be identified (block 112). The failing paths may be identified to the designers to determine a fix for the failing path, which may be incorporated into the next revision of the IC 10. Additionally, if the failing paths are equipped with programmable clocked circuits (decision block 114, yes leg), the delay in in the programmable clocked circuits may be overridden to permit the failing path to pass (block 116). Additional testing may be performed to determine if there are additional failures that were previously masked by the initial failing paths.

Numerous variations and modifications will become apparent to those skilled in the art once the above disclosure is fully appreciated. It is intended that the following claims be interpreted to embrace all such variations and modifications.

What is claimed is:

1. An integrated circuit comprising:
   a sequential element including a programmable delay circuit coupled to a clock input and configured to delay the clock input to generate a clock output, wherein an amount of the delay is selectable responsive to a delay input to the programmable delay circuit and a storage element configured to capture and store a data input responsive to the clock output from the programmable delay circuit; and
   a delay control circuit coupled to the delay input, wherein the delay control circuit is configured to generate a value on the delay input responsive to a combination of an operating state indication identifying an operating state of the integrated circuit and a process indication identifying a process corner at which the integrated circuit was manufactured, wherein the operating state is identified on a first input to the delay control circuit and the process corner is identified on a second input to the delay control circuit.

2. The integrated circuit as recited in claim 1 further comprising a power management unit configured to control the operating state of the integrated circuit, and wherein the power management unit is coupled to the first input to the delay control circuit and is configured to provide the first input identifying the operating state.

3. The integrated circuit as recited in claim 1 further comprising one or more fuses that are programmed at manufacture of the integrated circuit to identify the process corner, wherein the one or more fuses are coupled to the second input.

4. The integrated circuit as recited in claim 1 further comprising a thermal controller configured to provide a third input to the delay control circuit indicating a temperature of the integrated circuit, wherein the delay control circuit is configured to generate the value on the delay input responsive to the temperature.

5. The integrated circuit as recited in claim 1 further comprising a plurality of the programmable delay circuits coupled to the delay input, wherein a first programmable delay circuit of the plurality of programmable delay circuits is configured to select a first delay responsive to the value, and wherein a second programmable delay circuit of the plurality of programmable delay circuits is configured to select a second delay different from the first delay responsive to the value.

6. The integrated circuit as recited in claim 5 wherein the plurality of programmable delay circuits comprise a delay control decode circuit coupled to the delay input and configured to select delays responsive to the delay input.

7. The integrated circuit as recited in claim 1 further comprising a plurality of the programmable delay circuits, wherein the delay control circuit is configured to provide a plurality of the delay inputs to respective ones of the plurality of programmable delay circuits.

8. The integrated circuit as recited in claim 1 further comprising a clock gater circuit including a second programmable delay circuit coupled to the clock input and configured to delay the clock input to generate a second clock output, wherein an amount of the delay is selectable responsive to the delay input to the second programmable delay circuit, wherein the clock gater circuit has a second clock input coupled to the second clock output of the second programmable delay circuit.

9. The integrated circuit as recited in claim 1 further comprising a macro circuit including a second programmable delay circuit coupled to the clock input and configured to delay the clock input to generate a second clock output, wherein an amount of the delay is selectable responsive to the delay input to the programmable delay circuit, wherein the macro circuit has a second clock input coupled to the second clock output of the second programmable delay circuit.

10. An integrated circuit comprising:
a clocked circuit having a clock input, wherein the clocked circuit is configured to perform a specified operation responsive to a first clock, and wherein the clocked circuit comprises a delay circuit coupled to the clock input and configured to delay a second clock on the clock input to generate the first clock, wherein an amount of the delay is selectable responsive to a delay input to the clocked circuit, and wherein the clocked circuit comprises a clock gater circuit, and the specified operation comprises conditionally gating the first clock; and
a delay control circuit coupled to the delay input of the clocked circuit and configured to generate a value on the delay input to select the amount of the delay, wherein the delay control circuit is configured to map a combination of at least a first indication of an operating state of the integrated circuit and a second indication of a process corner in effect when the integrated circuit was manufactured to the value, wherein the mapping is predetermined based on static timing analysis performed during a design of the integrated circuit.

11. The integrated circuit as recited in claim 10 wherein the mapping is implemented in combinatorial logic circuitry in the delay control circuit.

12. The integrated circuit as recited in claim 11 wherein the delay control circuit further includes a programmable override circuit that is programmable to override the mapping.

13. The integrated circuit as recited in claim 10 wherein the mapping is programmed into a table in the delay control circuit using data determined from the static timing analysis.

14. The integrated circuit as recited in claim 10 further comprising a sequential element, wherein the sequential element comprises a second delay circuit coupled to the clock input and configured to delay the second clock on the clock input to generate a third clock, wherein an amount of the delay is selectable responsive to the delay input to the sequential element, and wherein the sequential element is configured to capture and store data in the sequential element responsive to the third clock.

15. The integrated circuit as recited in claim 10 further comprising a macro circuit, wherein the macro circuit comprises a second delay circuit coupled to the clock input and configured to delay the second clock on the clock input to generate a third clock, wherein an amount of the delay is selectable responsive to the delay input to the macro circuit, and wherein the macro circuit is configured to perform a second specified operation responsive to the third clock.

16. The integrated circuit as recited in claim 10 further comprising a plurality of the clocked circuits coupled to the delay input, wherein a first clocked circuit of the plurality of clocked circuits is configured to select a first delay responsive to the value, and wherein a second clocked circuit of the plurality of clocked circuits is configured to select a second delay different from the first delay responsive to the value.

17. The integrated circuit as recited in claim 10 further comprising a plurality of the clocked circuits, wherein the delay control circuit is configured to provide a plurality of the delay inputs to respective ones of the plurality of clocked circuits.

18. An integrated circuit comprising:
a plurality of sequential elements, clock gaters, and macro circuits, wherein a given one of the plurality of sequential elements, clock gaters, and macro circuits comprise a delay circuit coupled to a clock input to the given one of the plurality of sequential elements, clock gaters, and macro circuits and configured to delay a clock on the clock input for use internally in the given one of the plurality of sequential elements, clock gaters, and macro circuits, wherein an amount of the delay is selected via a delay input to the given one of the plurality of sequential elements, clock gaters, and macro circuits; and
a delay control circuit coupled to the delay input, wherein the delay control circuit is configured to generate a value on the delay input responsive to a combination of inputs identifying an operating state of the integrated circuit, a process corner at which the integrated circuit was manufactured, and a temperature of the integrated circuit.

19. The integrated circuit as recited in claim 18 wherein a first delay circuit in a first one of the plurality of sequential elements, clock gaters, and macro circuits is configured to select a first delay responsive to the value from the delay control circuit, and wherein a second delay circuit in a second one of the plurality of sequential elements, clock gaters, and macro circuits is configured to select a second delay different from the first delay responsive to the value.

20. The integrated circuit as recited in claim 18 wherein the delay control circuit is configured to provide a plurality of the delay inputs to respective delay circuits in the plurality of sequential elements, clock gaters, and macro circuits.

\* \* \* \* \*